United States Patent
Busse

(10) Patent No.: US 6,404,259 B1
(45) Date of Patent: Jun. 11, 2002

(54) DEVICE FOR GENERATING DIGITAL CONTROL SIGNALS

(75) Inventor: Olaf Busse, Munich (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/666,594

(22) Filed: Sep. 20, 2000

(30) Foreign Application Priority Data

Sep. 27, 1999 (DE) .......................................... 199 46 007

(51) Int. Cl.⁷ ................................................ G06F 1/04
(52) U.S. Cl. ...................................... 327/293; 327/361
(58) Field of Search .............................. 327/291, 293, 327/294, 298, 299, 172–176, 115, 117, 361; 377/47, 48

(56) References Cited

U.S. PATENT DOCUMENTS

| | | | | |
|---|---|---|---|---|
| 4,513,387 A | * | 4/1985 | Neyer ........................ 708/273 |
| 4,680,479 A | * | 7/1987 | Alonso ....................... 327/114 |
| 4,991,188 A | * | 2/1991 | Perkins ........................ 377/49 |
| 5,077,519 A | * | 12/1991 | Markow et al. ......... 324/76.47 |
| 5,088,057 A | * | 2/1992 | Amrany et al. ............. 364/703 |
| 5,424,667 A | * | 6/1995 | Sakai et al. ................. 327/115 |
| 5,767,747 A | * | 6/1998 | Pricer ............................ 331/46 |
| 5,867,050 A | * | 2/1999 | Matsuura ..................... 327/294 |
| 6,003,053 A | * | 12/1999 | Tanaka et al. ............... 708/103 |

FOREIGN PATENT DOCUMENTS

EP 0 708 579 A1 4/1996

* cited by examiner

Primary Examiner—Timothy P. Callahan
Assistant Examiner—Hai L. Nguyen
(74) Attorney, Agent, or Firm—Carlo S. Bessone

(57) ABSTRACT

The invention relates to a device for generating digital control signals having the following features:

an oscillator (10), which has a digital output two storage means (20, 30) for storing the value of digitally coded variables, which each have a clock input (22, 31) connected to the digital output (11) of the oscillator (10), a data input (21, 32) and a data output (23, 33)

an adder (40) which has two data inputs (41, 42), a data output (43) and a carry output (44), where the first data input (41) of the adder (40) is connected to the data output (23) of the first storage means (20), the second data input (42) of the adder (40) is connected to the data output (33) of the second storage means (30), the data output (43) of the adder (40) is connected to the data input (32) of the second storage means (30), and the carry output (44) of the adder (40) is connected to a pulse divider (50).

2 Claims, 2 Drawing Sheets

DEVICE FOR GENERATING DIGITAL CONTROL SIGNALS

The invention relates to a device and a method for generating digital control signals.

TECHNICAL FIELD

In particular, the invention relates to a device for generating digital control signals which is suitable for pulse-width-modulated driving, for example of a radio-frequency generator. The term radio-frequency generators is understood to mean, in particular, half-bridge-invertors, full-bridge invertors and push-pull invertors which, for example, are used in so-called electronic ballasts for radio-frequency operation of fluorescent lamps or of high-pressure discharge lamps. The frequency of the radio-frequency AC voltage generated by such invertors is tuned to the different operating states of the fluorescent lamps for example by means of a microprocessor and integrated circuits by generation of pulse-width-modulated drive signals for the switching transistors of the invertor, or is used for operating a high-pressure discharge lamp with frequency-modulated AC current in accordance with the published patent application EP 0708579 A1. However, only digital control signals can be generated with the aid of a microprocessor. Accordingly, the frequency of the radio-frequency generator can be altered only in discrete steps. In conventional drive devices, the smallest possible adjustable change in frequency is limited by the operating frequency of the radio-frequency generator. The following example shall clarify these facts in more detail. It is known to perform the driving of the radio-frequency generator with the aid of an auto-reload timer implemented in the microprocessor. The auto-reload timer is essentially a programable counting mechanism which is operated by an oscillator with a predetermined frequency and is loaded with a predeterminable numerical value. If the auto-reload timer is loaded with the numerical value N and if the frequency of the oscillator which predetermines the counting cycle is designated by F, then the auto-reload timer can be used to generate an operating frequency f which is given by the formula f=F/2N. The next highest operating frequency can be achieved with the numerical value N−1. The minimum frequency step $\Delta f$ is therefore $\Delta f=f/(N-1)$. An obtainable operating frequency of 50 kHz and a minimum frequency step of 505 Hz result for N=100 and F=10 MHz. That is insufficient for many applications, in particular for driving radio-frequency generators which are intended to enable radio-frequency operation of fluorescent lamps and finely gradated dimming of the fluorescent lamps.

SUMMARY OF THE INVENTION

The object of the invention is to provide an improved device for generating digital control signals. In particular, the advice according to the invention is intended to be suitable for finely gradate pulse-width-modulated driving. Moreover, the object of the invention is to specify an improved method for generating digital control signals.

The invention's device for generating digital control signals has the following features:
- an oscillator, which has a digital output,
- a first storage means for storing the value of a digitally coded variable, which has a clock input connected to the digital output of the oscillator, a data input and a data output,
- a second storage means for storing the value of a digitally coded variable, which has a clock input connected to the digital output of the oscillator, a signal input and a signal output,
- an adder which has two data inputs, a data output and a carry output, where
  the first data input of the adder is connected to the data output of the first storage means
  the second data input of the adder is connected to the data output of the second storage means,
  the data output of the adder is connected to the data input of the second storage means, and
  the carry output of the adder is connected to a pulse divider.

The device according to the invention makes it possible to generate digital control signals whose frequency is gradated considerably more finely and which enable correspondingly more accurate pulse-width-modulated driving, for example of a radio-frequency generator. The minimum frequency difference that may be exhibited by two control signals generated by the device according to the invention is limited only by the storage size or word width of the adder and of the two storage means, given a predetermined clock frequency of the oscillator. Each additional bit in the register of the adder halves the minimum frequency difference or the distance between two adjacent frequencies.

The device according to the invention is advantageously equipped with a 16-bit adder and two 16-bit latches. The use of 16-bit components allows the generation of digital control signals whose frequency can already be gradated very finely. If, for example, the clock frequency of the oscillator is 10 MHz, then control signals in the frequency range of from approximately 76.3 Hz to 4.99 MHz can be generated using the abovementioned 16-bit components. The minimum frequency step is approximately 76.3 Hz in the entire frequency range. A T flip-flop is advantageously used as pulse divider in the device according to the invention. It is particularly well suited to converting the carry signal into a pulse-width-modulated control signal, since the output state of the T flip-flop changes upon exactly one edge—upon the occurrence of the rising edge in the present exemplary embodiment—of the carry signal. The device according to the invention may advantageously be designed as part of a microprocessor. It is also possible to implement a plurality of the device according to the invention in a microprocessor in order, for example, to generate a plurality of separate control signals. A microprocessor of this type may advantageously be inserted into a drive device for a radio-frequency generator. The device according to the invention can advantageously be used for frequency control or pulse-width modulation of a radio-frequency generator, in particular a radio-frequency generator from the group of half-bridge invertor, full-bridge invertor and push-pull invertor.

The invention's method for generating digital control signals has the following method steps:
A) storage of a predeterminable value of a first variable in the first storage means,
B) feeding of the value of the first variable stored in the first storage means into the adder as first summand,
C) feeding of an instantaneous value of a second variable stored in the second storage means into the adder as second summand,
D) determination of the sum of the first and second summands in the adder and transfer of a carry signal to the pulse divider,
E) storage of the addition result determined by the adder in the second storage means as new instantaneous value of the second variable, F) repetition of the abovementioned method steps B) to F) in a cycle predetermined by the oscillator.

With the aid of the working method described above, digital control signals that can be used for pulse-width-modulated driving are generated whose frequency can be gradated in comparatively small steps. Given a predetermined oscillator frequency and predetermined hardware properties, the frequency of the digital control signals generated by the method according to the invention is determined by the specification of a numerical value for the first variable. A change in frequency of the digital control signals generated by the method according to the invention is advantageously brought about by changing the value of the first variable stored in the first storage means and executing method steps A) to F).

DESCRIPTION OF THE PREFERRED EXEMPLARY EMBODIMENT

The invention is explained in more detail below using a preferred exemplary embodiment. In the figures.

Figure 1:
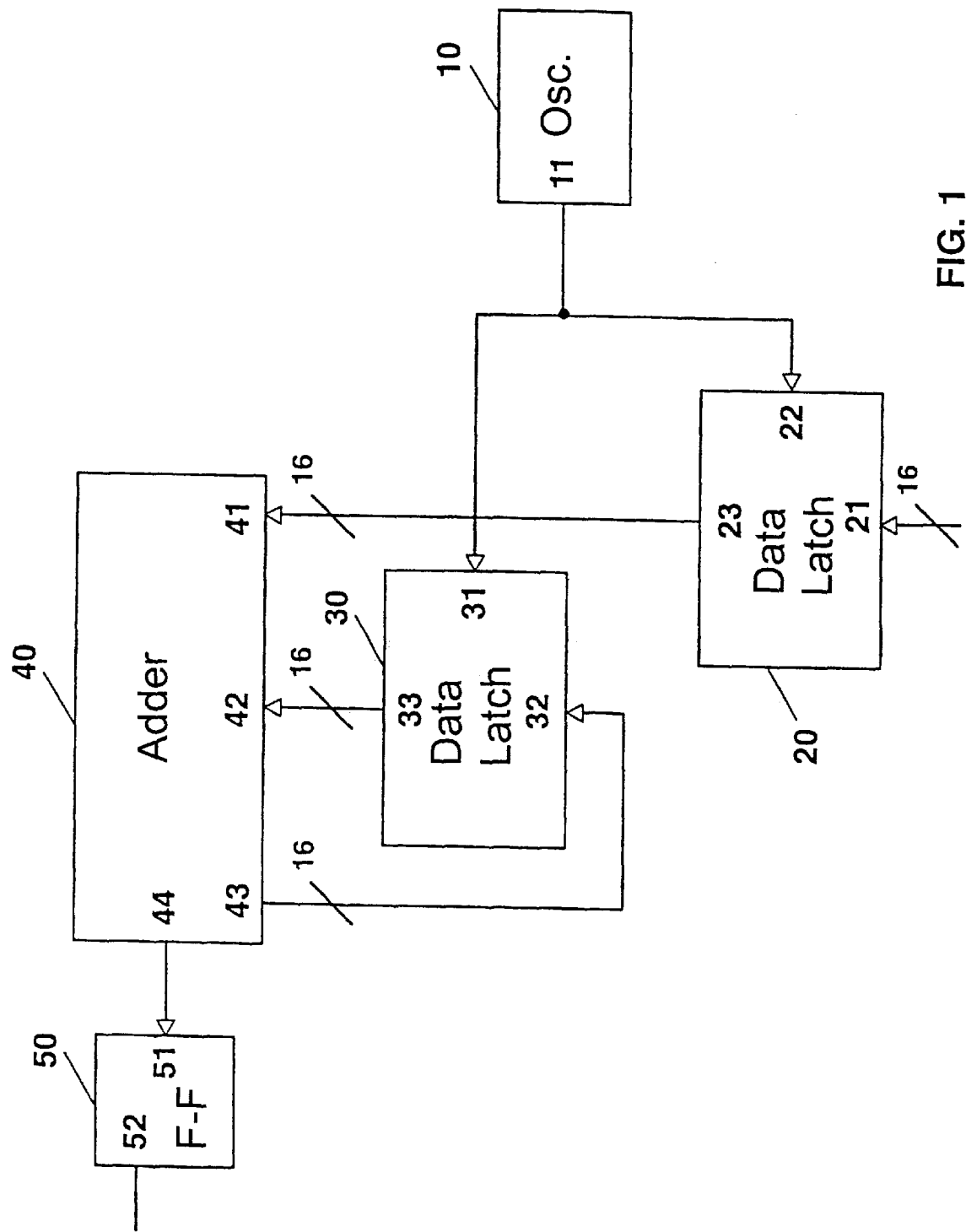
FIG. 1 shows a block diagram of the device according to the invention in a schematic illustration.

FIG. 1 shows a schematic illustration of the preferred exemplary embodiment of the device according to the invention. The device according to the invention has an oscillator 10, a first 16-bit data latch 20, a second 16-bit data latch 30, a 16-bit adder 40 and a T flip-flop 50. The digital output 11 of the oscillator 10 is connected to the clock input 22 of the first 16-bit data latch 20 and to the clock input 31 of the second 16-bit data latch. The first 16-bit data latch is connected via a 16-bit data line to the first data input 41 of the 16-bit adder 40. The second 16-bit data latch 30 is connected via a 16-bit data line to the second data input 42 of the adder 40. The data output 43 of the 16-bit adder 40 is connected to the data input 32 of the second 16-bit data latch 30. The carry output 44 of the 16-bit adder 40 is connected to the input 51 of the T flip-flop 50. The output 52 of the T flip-flop 50 forms the signal output 52 of the device according to the invention. The data input 21 of the first 16-bit data latch forms the signal input 21 of the device according to the invention. The data input 21 can be connected via a 16-bit data line to the data output of a microprocessor. However, it is also possible to embody the device described above as part of a microprocessor. The signal output 52 can be connected directly or via an amplifier arrangement to a radio-frequency generator, for example to an invertor.

Figure 2:
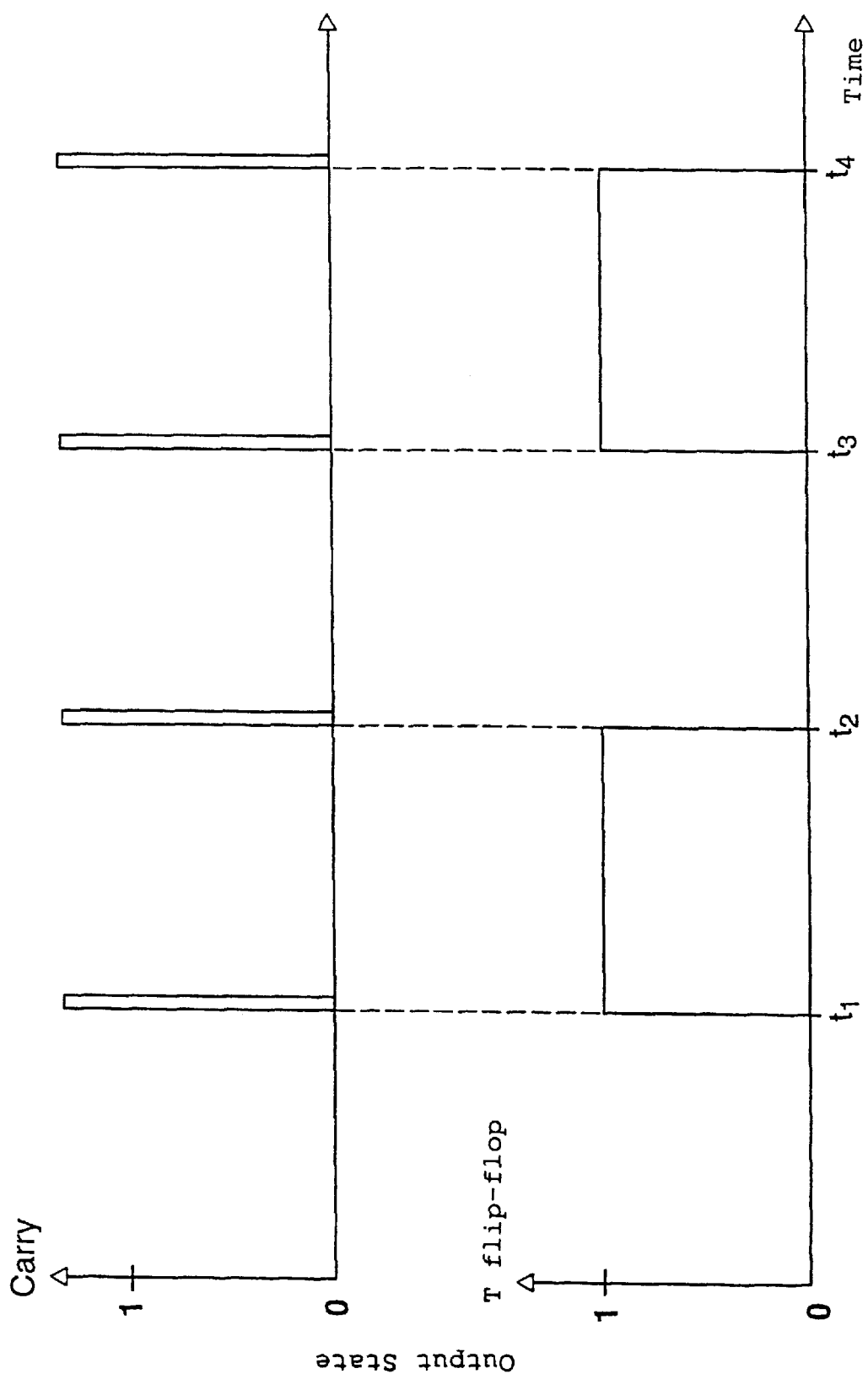
FIG. 2 shows a schematic illustration of the digital signals generated at the carry output of the adder and at the output of the pulse divider.

The method of operation of the device represented in FIG. 1 is explained in more detail below. The first 16-bit data latch 20 is loaded to a predeterminable value N via the data input 21. The value N stored in the first 16-bit data latch is fed to the first data input 41 of the 16-bit adder 40 and stored as first summand for a first addition in the adder 40. The instantaneous value of the stored content of the second 16-bit data latch is equal to zero. It is fed to the second data input 42 of the 16-bit adder 40 as second summand for the first addition. The result of the addition carried out in the adder 40 is fed to the second 16-bit data latch 30, where it is stored as new instantaneous value for the next addition to be carried out. In order to carry out the second and each further addition the adder 40 is fed the value N stored in the first 16-bit data latch 20 as first summand and the instantaneous value of the stored content of the second 16-bit data latch 30 which is equal to the result of the addition carried out immediately beforehand as second summand. All the additions are carried out by binary code. The stored contents of the two data latches 20, 30 are transferred to the adder 40 in the switching cycle predetermined by the oscillator 10. The oscillator 10 oscillates at a frequency of 10 MHz in the preferred exemplary embodiment. This means that the adder 40 is fed with new first and second summands for the respective next addition at a temporal interval of 0.1 μs. The first summand retains its value N during all the additions. The value W of the second summand, by contrast, changes continuously. For the k-th addition, the said value is $W=(k-1)N$ module $2^{16}$. After a specific number of additions, that is to say when the result of the previous additions reaches or exceeds the value $2^{16}=65536$, a counter overflow occurs in the adder 40. Upon each counter overflow of the adder 40 its carry output 44 is put into the logic state "1". If no counter overflow takes place, then the carry output 44 retains the logic state "0" or is reset into this state. The state of the carry output 44 is detected by the input 51 of the T flip-flop 50. If no counter overflow takes place, then the input 51 of the T flip-flop 50 detects a logic "0". The output 52 of the JK flip-flop 50 will therefore retain its instantaneous output state. If, on the other hand, a counter overflow does occur, then the input 51 of the T flip-flop 50 detects a logic "1". The output 52 of the T flip-flop 50 is therefore changed over into the other logic output state. The T flip-flop 50 reacts to the rising edge of the carry signal. The profile of the carry signal at the carry output 44 and of the output signal at the output 52 of the T flip-flop 50 are illustrated schematically in FIG. 2. In this way, the carry signal is converted by the T flip-flop 50 into a digital signal that can be used for pulse-width modulation, for example of an invertor. The temporal interval of the carry pulses depends on the number of additions which is required to cause a counter overflow, and can therefore be influenced in a targeted manner by specification of the value N. The frequency of the output signal at the output 52 of the T flip-flop 50 is determined by the temporal sequence of the carry pulses. The average frequency F of the output signal at the output 52 of the device can be calculated in accordance with the formula $$F=0.5\ C\ N/2^{16},$$

where C is the clock frequency of the oscillator 10.

The lowest frequency which can be generated by the device turns out to be F=76.3 Hz for N=1 and C=10 Mz, and as the highest frequency F=4.999 MHz. is obtained with N=65535. In accordance with the abovementioned formula the average frequency F of the output signal at the output 52 of the device can be set in a targeted manner by suitable selection of the value N which is loaded into the first 16-bit data latch. The average frequency F of the output signal at the output 52 is altered by corresponding specification of the value N in discrete steps. The value N is specified under program control, for example by means of a microprocessor. The minimum adjustable frequency step $\Delta f$ is $0.5\ C/2^{16}$, and therefore approximately 76.3 Hz in the present exemplary embodiment. The fact that a further halving of the minimum frequency step $\Delta F$ can be obtained with each additional bit in the adder 40 and the storage means 20, 30 can be gathered from the above formulae.

An important aspect of the invention will be explained in more detail at this point. As has already been mentioned above, the value W of the second summand which is stored in the second 16-bit data latch 30 and is used for carrying out the k-th addition is calculated according to the formula:

$$W=(k-1)N\ \text{module}\ 2^{16}.$$

It is evident from this formula above that the value W of the second summand is not as a rule reset to zero after a counter overflow. The addition immediately following a counter overflow is therefore carried out generally—the exception arises only when the value N is a power of two—with a second summand which has a value W which is other than zero and changes after each counter overflow. Consequently, the triggering of the next counter overflow may already necessitate one addition fewer. Accordingly, the carry pulses illustrated schematically in FIG. 2 do not generally follow in constant time periods. The temporal interval of two successive carry pulses can therefore vary by the time duration required for an addition, said duration lasting 0.1 $\mu$s in the present exemplary embodiment. For this reason, the digital output signals at the output 52 are generally slightly pulse-width-modulated. In this respect, only an average value is specified by the above-specified formula for the frequency F of the output signals generated at the output 52.

The device described above can be used for example for generating drive signals for the switching transistors of a half-bridge invertor. A series resonant circuit, for example, which essentially comprises a resonance capacitor and a resonance inductor, is connected downstream of the half-bridge invertor. A discharge lamp, for example a fluorescent lamp or a high-pressure discharge lamp, is arranged in parallel with the resonance capacitor. The half-bridge invertor applies a radio-frequency AC voltage with a frequency of above 20 KHz to the discharge lamp. The frequency of the lamp current or lamp voltage is determined by the switching frequency of the alternately switching transistors of the half-bridge invertor and can therefore be controlled directly by the above-described device according to the invention. In this case, it is possible for the drive signals for the two switching transistors of the half-bridge invertor to be generated by a single or else by two separate devices in accordance with the exemplary embodiment described above. If the discharge lamp to be operated is a fluorescent lamp, then, by suitable specification of the value N and execution of the abovementioned working steps A) to F), the switching frequency of the half-bridge invertor transistors is approximated to the resonant frequency of the series resonant circuit, in order to initiate the striking of a gas discharge in the fluorescent lamp by means of the resonant increase method. Once the gas discharge has been struck, the switching frequency of the half-bridge invertor is increased by changing the value N and executing the abovementioned working steps A) to F) with the new value N of the first variable stored in the first 16-bit data latch. In order to dim the fluorescent lamp, the frequency of the lamp current can be changed by variation of the value N.

If the discharge lamp is a high-pressure discharge lamp, then frequency modulation of the AC lamp current, as is disclosed for example in the published patent application EP 0708579 A1, is carried out with the aid of the half-bridge invertor and the invention's drive device for the half-bridge invertor. The switching frequency of the half-bridge invertor transistors and thus also the lamp current frequency is modulated by program-controlled variation of the value N and execution of the abovementioned working steps A) to F) for each new value N, in order to avoid the recurrence of acoustic resonances in the discharge medium of the high-pressure discharge lamp.

The invention is not restricted to the exemplary embodiment which is explained in more detail above. By way of example, it is at the discretion of the person skilled in the art to use other suitable storage means or another adder instead of the 16-bit data latches and 16-bit adder specified in the exemplary embodiment. Furthermore, one or more of the devices according to the invention can also be embodied as part of a microprocessor.

What is claimed is:

1. A device for generating digital control signals having the following features:

an oscillator (10), which has a digital output(11), a first storage means (20) for storing the value of a digitally coded variable, which has a clock input (22) connected to the digital output (11) of the oscillator (10), a data input (21) and a data output (23), a second storage means (30) for storing the value of a digitally coded variable, which has a clock input (31) connected to the digital output (11) of the oscillator (10), a data input (32) and a data output (33), an adder (40) which has two data inputs (41, 42), a data output (43) and a carry output (44), where the first data input (41) of the adder (40) is connected to the data output (23) of the first storage means (20), the second data input (42) of the adder (40) is connected to the data output (33) of the second storage means (30), the data output (43) of the adder (40) is connected to the data input (32) of the second storage means (30), and the carry output (44) of the adder (40) is connected to a pulse divider (50), the first (20) and second storage means (30) are designed as a 16-bit latch and the adder (40) is designed as a 16-bit adder.

2. The device as claimed in claim 1, wherein the pulse divider (50) is a T flip-flop.

* * * * *